United States Patent
Lin et al.

(10) Patent No.: US 10,527,816 B2
(45) Date of Patent: Jan. 7, 2020

(54) LENS DRIVING MODULE

(71) Applicant: TDK TAIWAN CORP., Yangmei Taoyuan (TW)

(72) Inventors: Kun-Shih Lin, Yangmei Taoyuan (TW); Yu-Sheng Li, Yangmei Taoyuan (TW); Shih-Ting Huang, Yangmei Taoyuan (TW); Yi-Hsin Nieh, Yangmei Taoyuan (TW); Yu-Huai Liao, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 194 days.

(21) Appl. No.: 15/257,050

(22) Filed: Sep. 6, 2016

(65) Prior Publication Data

US 2017/0153413 A1    Jun. 1, 2017

(30) Foreign Application Priority Data

Dec. 1, 2015 (TW) ............................... 104140046 A
Jun. 3, 2016 (TW) ............................... 105117514 A

(51) Int. Cl.
*G02B 7/08* (2006.01)
*H02K 41/035* (2006.01)
*H02K 5/04* (2006.01)

(52) U.S. Cl.
CPC ................. *G02B 7/08* (2013.01); *H02K 5/04* (2013.01); *H02K 41/0356* (2013.01)

(58) Field of Classification Search
CPC .......... G02B 7/02; G02B 7/021; G02B 7/022; G02B 7/023; G02B 7/025; G02B 7/04;
(Continued)

(56) References Cited

U.S. PATENT DOCUMENTS 4,106,969 A * 8/1978 Puyplat ............... B29C 65/3424
156/272.4
8,610,824 B2 * 12/2013 Kim ..................... H04N 5/2257
348/294
(Continued)

FOREIGN PATENT DOCUMENTS

JP    2007093865 A    4/2007
JP    2010008446 A    1/2010
(Continued)

OTHER PUBLICATIONS

Machine translation of WO2014178260, obtained electronically from Espacenet Apr. 5, 2016.*

(Continued)

*Primary Examiner* — Cara E Rakowski
(74) *Attorney, Agent, or Firm* — Muncy, Geissler, Olds & Lowe, P.C.

(57) ABSTRACT

A lens driving module is provided, which includes a lens assembly; a base; a lens driving assembly configured to driving the lens unit to move relative to the base; a housing surrounding the lens driving assembly; an intermediate material configured to connect the base to the housing; and an anchoring member disposed on the base. The anchoring member has a front surface and a clamping surface formed at an angle that is greater than 0 degrees relative to the front surface. A portion of the intermediate material is disposed on the clamping surface.

4 Claims, 12 Drawing Sheets

(58) Field of Classification Search
CPC .......... G02B 7/08; G02B 7/09; H04N 5/2252; H04N 5/2253; H04N 5/2254; G03B 3/10; G03B 17/02; B29C 66/70; B29C 66/712; B29C 65/48; B29C 65/00
See application file for complete search history.

(56) References Cited

U.S. PATENT DOCUMENTS

| | | | | |
|---|---|---|---|---|
| 2007/0046632 | A1* | 3/2007 | Schomann | G02B 7/004 345/166 |
| 2009/0310907 | A1* | 12/2009 | Ikeda | G02B 6/4239 385/14 |
| 2012/0050895 | A1* | 3/2012 | Kotanagi | G02B 7/025 359/823 |
| 2014/0355120 | A1* | 12/2014 | Yeo | G03B 3/10 359/557 |
| 2016/0018667 | A1* | 1/2016 | Yeo | G02B 7/04 359/557 |
| 2016/0050373 | A1* | 2/2016 | Nakamura | G03B 5/02 348/208.11 |
| 2017/0126938 | A1* | 5/2017 | Newiger | H04N 5/2252 |

FOREIGN PATENT DOCUMENTS

| | | | | |
|---|---|---|---|---|
| JP | WO 2014178260 A1 * | 11/2014 | .......... | H04N 5/2257 |
| JP | 2015141336 A | 8/2015 | | |
| TW | 200848830 A | 12/2008 | | |
| TW | 201535006 A | 9/2015 | | |

OTHER PUBLICATIONS

An Office Action from corresponding Taiwanese Application No. 105117514 dated Jan. 16, 2017; 4 pgs.

* cited by examiner

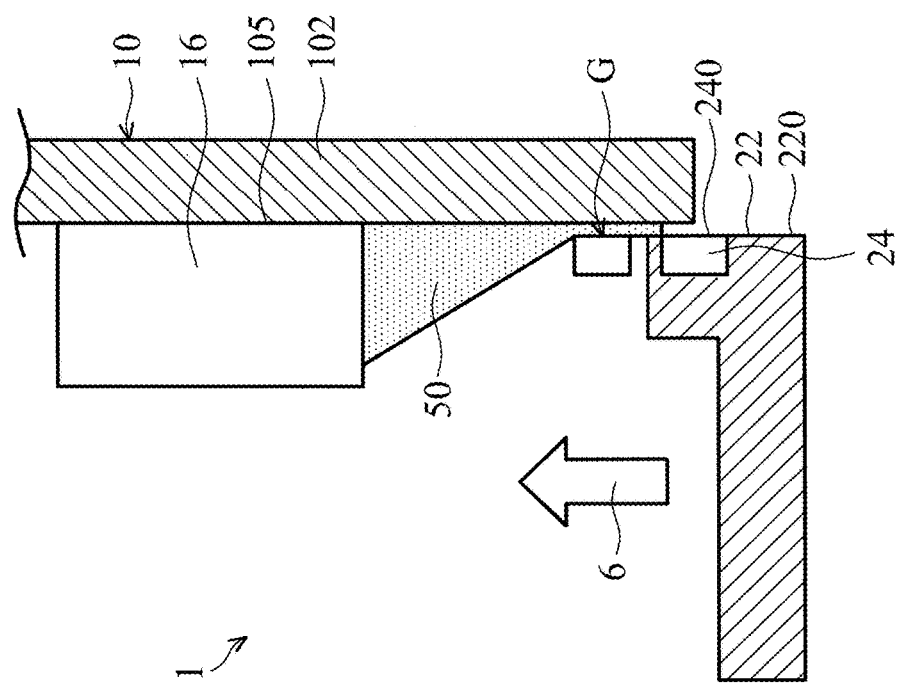

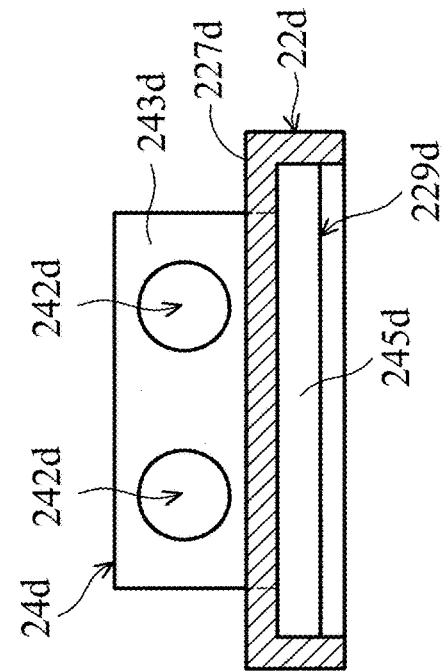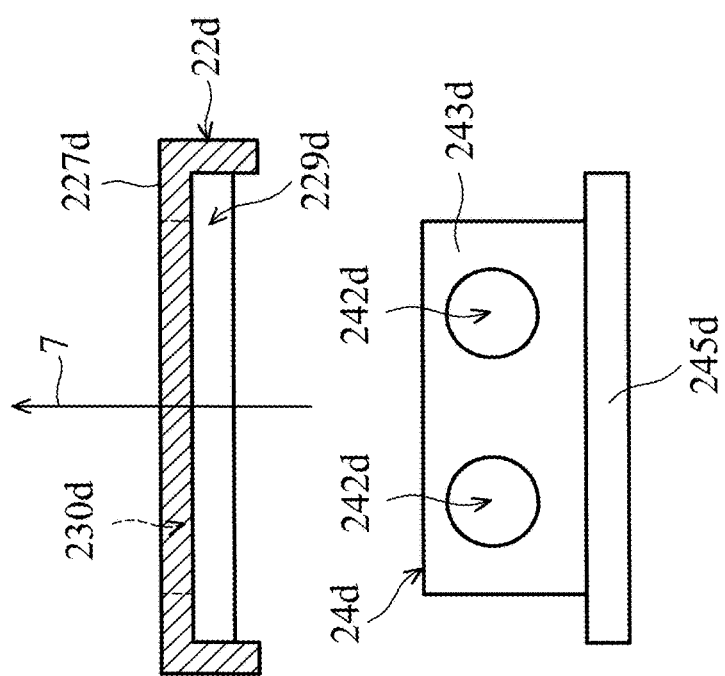

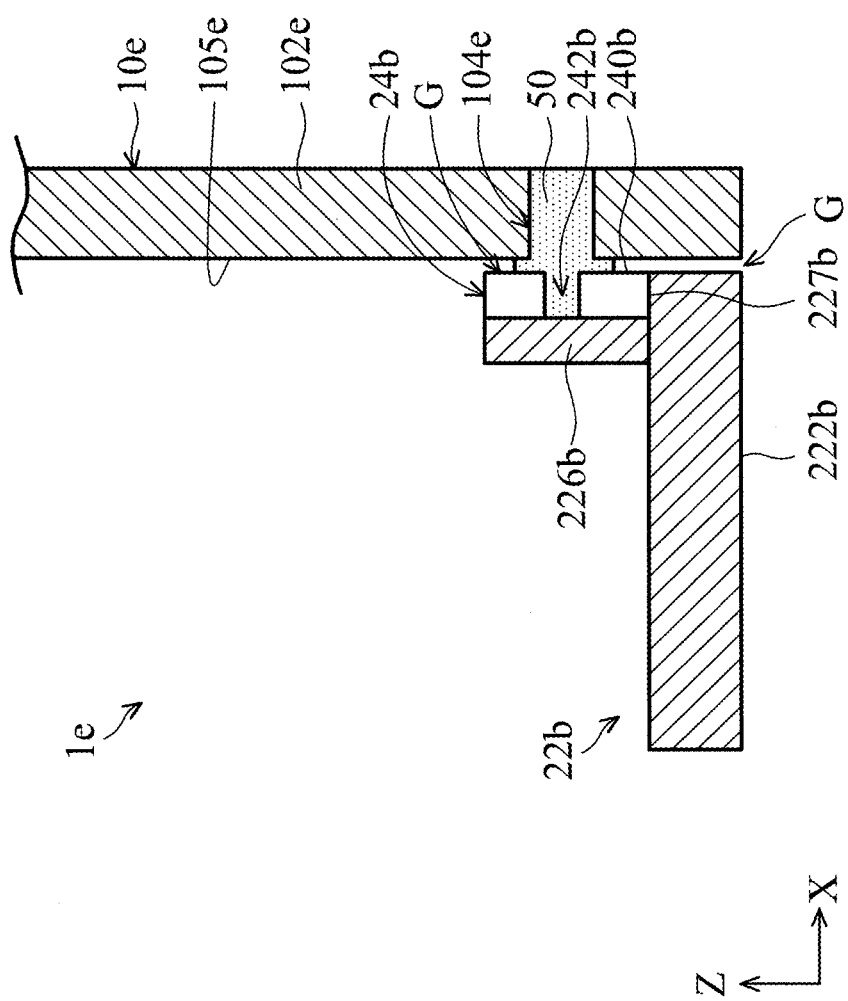

LENS DRIVING MODULE

CROSS REFERENCE TO RELATED APPLICATIONS

This application claims the priority of Taiwan Patent Application No. 105117514, filed on 3 Jun. 2016, which claims the priority of Taiwan Patent Application No. 104140046, filed on 1 Dec. 2015, the disclosure of which is hereby incorporated by reference herein in its entirety.

BACKGROUND OF THE DISCLOSURE

Field of the Invention

The present invention relates to a driving module, and more particularly to a lens driving module comprising an electromagnetic driving assembly which converts electrical energy into mechanical energy.

Description of the Related Art

Some electronic devices are equipped with a driving module to drive an element to move a predetermined distance. For example, an electronic device having an image-capturing function usually includes a driving module to generate driving power. One or more optical lens units of the electronic device are driven by the driving power to move along an optical axis, so as to facilitate auto-focus and auto-zoom controls.

The conventional lens driving module usually includes a base and a housing, and a space is defined by the base and the housing to contain other elements. The base is connected to the housing via an adhesive. However, the adhesive is not capable of connecting the base to the housing stably, and the base is easily separated from the housing as impact occurs. Additionally, in order to connect to the base to the housing, a groove is formed on the base to receive the adhesive. However, the size of the base is increased due to the fact that the groove has a significant thickness.

Therefore, a driving module that has the advantages of small size and greater structure strength is desired by manufacturers.

BRIEF SUMMARY OF THE DISCLOSURE

Accordingly, one objective of the present disclosure is to provide a lens driving module with reliable structure and being able to meet the requirement of being slim.

According to some embodiments of the disclosure, the lens driving module includes a lens assembly; a base; a lens driving assembly, configured to drive the movement of the lens assembly relative to the base; a housing surrounding the lens driving assembly; an intermediate material, configured to connect the base to the housing; and an anchoring member, disposed on the base and having a front surface facing the housing and a clamping surface formed at an angle that is greater than 0 degrees relative to the front surface, and a portion of the intermediate material is disposed on the clamping surface.

In some embodiments, the anchoring member has a front surface facing the housing and a rear surface opposite to the front surface, and the through hole penetrates the front surface and the rear surface, wherein the intermediate material connects an edge of the through hole and the front surface.

In some embodiments, the edge of the through hole comprises a first segment and a second segment arranged closer to the base than the first segment, wherein the first segment is covered by the intermediate material, and the second segment is covered by the base.

In some embodiments, the base comprises a mounting surface, and the anchoring member comprises an engaging port and a coupling portion. The engaging portion is positioned on the mounting surface. The through hole is entirely formed on the engaging portion The coupling portion, positioned beneath the mounting surface, is connected to the engaging portion. The anchoring member is affixed to the base via the coupling portion.

In some embodiments, the anchoring member comprises a front surface, and the through hole is formed on the front surface, and the base comprises a lateral surface adjacent to the front surface, wherein the front surface of the anchoring member is aligned with the lateral surface of the base.

In some embodiments, the housing comprises a mounting hole facing the through hole of the anchoring member, and the intermediate material continuously extends from the mounting hole to the through hole.

In some embodiments, the lens driving module comprises two anchoring members, respectively disposed on two lateral surfaces of the base, wherein the two lateral surfaces are arranged in a direction that is perpendicular to the optical axis of the lens assembly.

In some embodiments, the anchoring member comprises: a first segment; and a second segment connected to the first segment and formed at an angle that is greater than 0 degrees relative to the first segment; wherein the front surface is located at an end surface of the second segment, and the clamping surface is located at the bottom surface of the second segment.

In some embodiments, the housing is made of a different material than the material of the base, and the bonding force between the intermediate material and the anchoring member is greater than the bonding force between the intermediate material and the base.

In some embodiments, the intermediate material comprises a binding adhesive.

BRIEF DESCRIPTION OF THE DRAWINGS

For a more complete understanding of the embodiments, and the advantages thereof, reference is now made to the following descriptions taken in conjunction with the accompanying drawings.

FIG. 5 shows a schematic view of a method for assembling a lens driving module, in accordance with some embodiments of the disclosure.

FIG. 10 shows an exploded view of an anchoring member and a base, in accordance with some embodiments of the disclosure.

FIG. 11 shows a schematic view of an anchoring member connecting to a base, in accordance with some embodiments of the disclosure.

FIG. 12 shows a schematic view of an anchoring member connecting to a base, in accordance with some embodiments of the disclosure.

DETAILED DESCRIPTION OF THE ILLUSTRATIVE EMBODIMENTS

Figure 1:
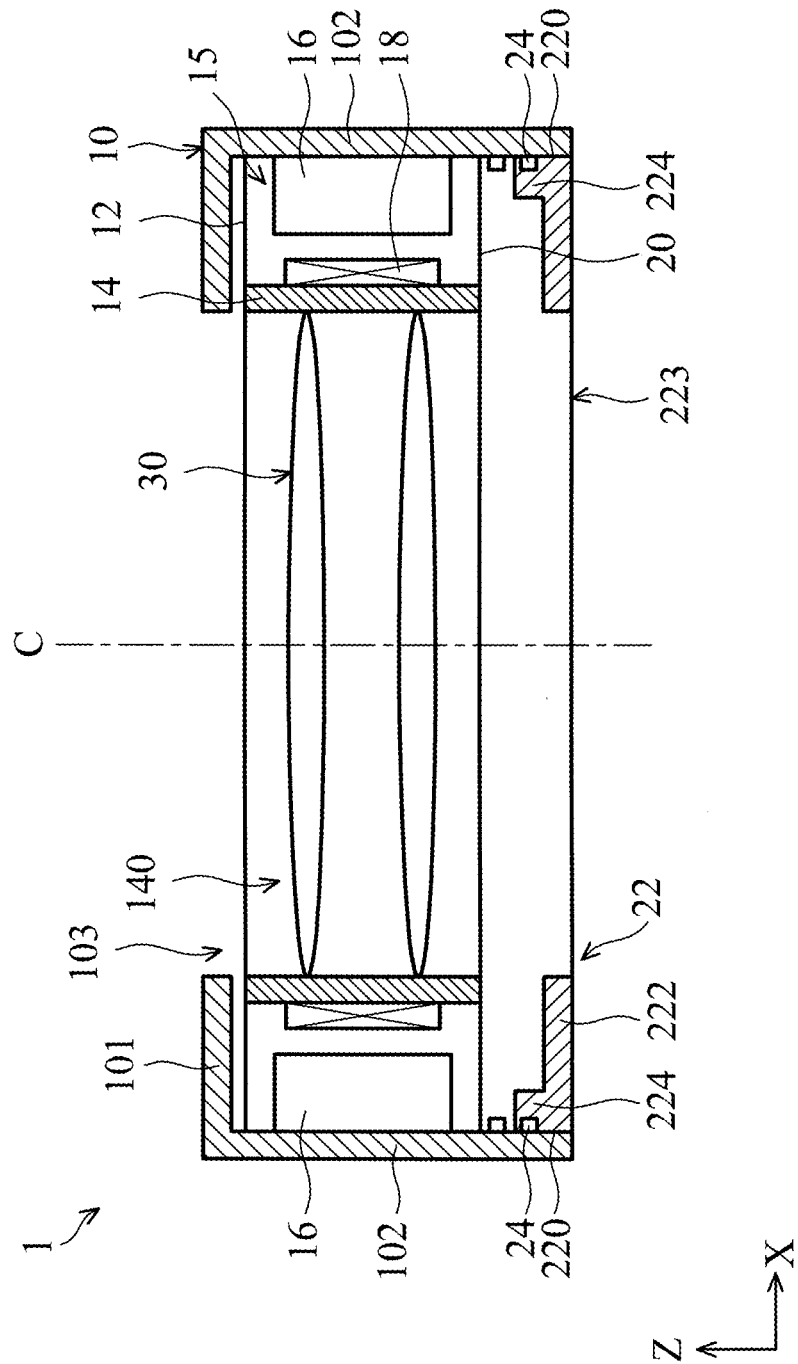
FIG. 1 shows a schematic view of a lens driving module, in accordance with some embodiments of the disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and "a layer is disposed over another layer" may indicate not only that the layer directly contacts the other layer, but also that the layer does not directly contact the other layer, there being one or more intermediate layers disposed between the layer and the other layer.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

FIG. 1 shows a schematic view of a lens driving module 1, in accordance with some embodiments of the disclosure.

In some embodiments, the lens driving module 1 is a voice coil motor (VCM) and includes a housing 10, an upper spring sheet 12, a lens barrel 14, a lens driving assembly 15, a lower spring sheet 20, a base 22, an anchoring member 24, and a lens assembly 30. The elements of the lens driving module 1 can be added to or omitted, and the invention should not be limited by the embodiment.

In some embodiments, the housing 10 includes an upper housing member 101 and one or more lateral housing members 102. The upper housing member 101 is penetrated by an opening 103. The lateral housing member 102 extends from the edge of the upper housing member 101 toward the base 22 and connects to the base 22. The upper spring sheet 12, the lens barrel 14, the lens driving assembly 15, and the lower spring sheet 20 are disposed in a space defied by the housing 10 and the base 22.

The upper spring sheet 12 and the lower spring sheet 20 are configured to support the lens barrel 14. The lens barrel 14 is suspended in the spaced defied by the housing 10 and the base 22 in a manner that is able to move in a vertical direction (Z axis direction). The lens barrel 14 is penetrated by a passage 140 and is configured to support an element such as the lens assembly 30.

The lens driving assembly 15 is configured to drive the movement of the lens assembly 30 relative to the base 22. In some embodiments, the lens driving assembly 15 includes a number of magnetic elements 16 (such as the two magnetic elements 16), and a coil assembly 18. The coil assembly 18 is a circular structure that surrounds the outer surface of the lens barrel 14. The coil assembly 18 is configured to receive an electric current and produce a magnetic field to drive the lens barrel 14 to move relative to the housing 10 and the base 22. In some embodiments, the lower spring sheet 20 is electrically connected to an external circuit, and the coil assembly 18 is electrically connected to the lower spring sheet 20. The electric current from the external circuit is transmitted to the coil assembly 18 via the terminals and the lower spring sheet 20.

The two magnetic elements 16 are disposed on the lateral housing member 102 of the housing 10 and face the coil assembly 18. In the operation of the lens driving module 1, the lens barrel 14 is stably driven to move in the vertical direction (Z-axis direction) by the magnetic field of the two magnetic elements 16 and the coil assembly 18. As a result, the control accuracy of the lens barrel 14 is improved. However, it should be appreciated that the positions of the two magnetic elements 16 should not be limited to the embodiment. The position of the magnetic element 16 can be modified, as along as the lens barrel 14 can be stably driven by the magnetic force. In some embodiments, the coil assembly 18 is positioned on the lateral housing member 102, and the magnetic element 16 is positioned on the lens barrel 14 and faces the coil assembly 18. In addition, the numbers of the magnetic elements 16 can be adjusted according to demand and should not be limited to the above embodiments. In some embodiments, the lens driving assembly 15 includes four the magnetic elements 16.

Figure 2:
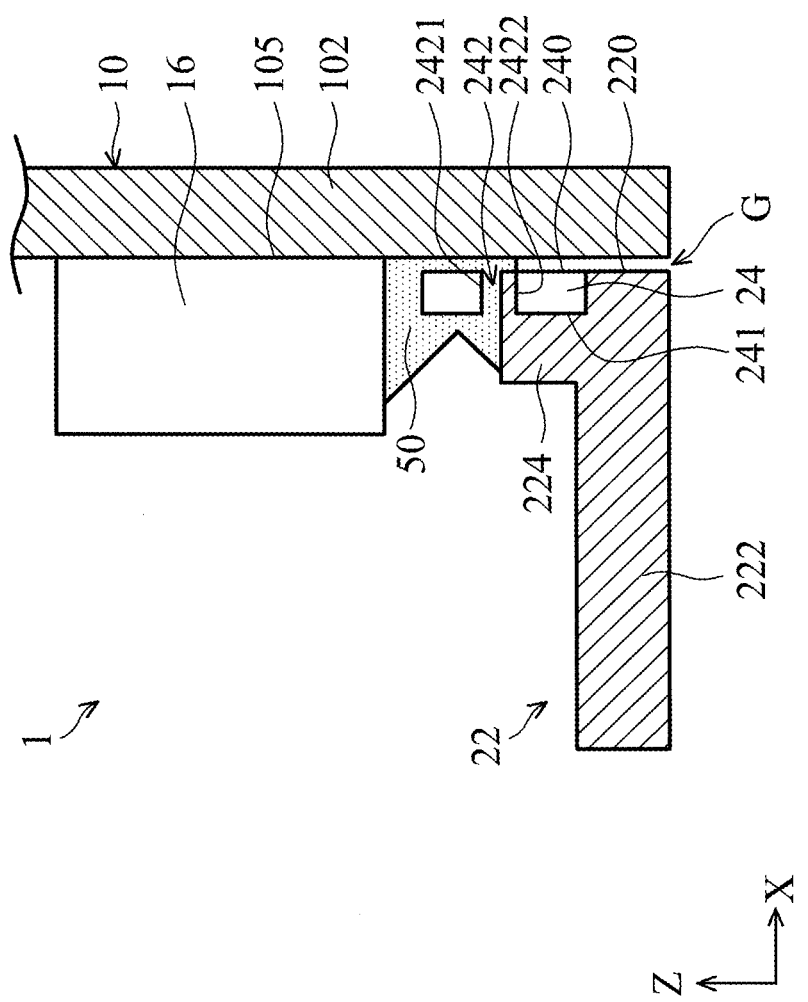
FIG. 2 shows a schematic view of partial elements of a lens driving module, in accordance with some embodiments of the disclosure.

In some embodiments, the housing 10 is a yoke, and the two magnetic elements 16 are directly attached on the inner surface of the lateral housing member 102 that faces the lens barrel 14. As a result, the process for assembling the two magnetic elements 16 is simplified. In some embodiments, the housing 10 is made of resin, and the two magnetic elements 16 are fixed on the lateral housing member 102 via an intermediate material 50 (FIG. 2). The method for assembling the two magnetic elements 16 is described below.

In some embodiments, the base 22 includes a main body 222 and two extension portions 224. The main body 222 has a rectangular shape, and the main body 222 is penetrated by an opening 223. The two extension portions 224 are respectively formed adjacent to the two lateral surfaces 220 of the main body 222. The two extension portions 224 extrude toward the upper housing member 101 from the main body 222. The base 22 may be made by resin or another suitable material.

FIG. 2 shows schematic view of partial elements of the lens driving module 1 in accordance with some embodiments. Referring to FIGS. 1 and 2, in some embodiments, the two anchoring members 24 are respectively disposed on the two extension portions 224. Each of the anchoring members 24 has a front surface 240 and a rear surface 241 opposite to the front surface 240. The front surface 240 and the rear surface 241 of each anchoring member 24 are penetrated by two through holes 242 (only one through hole 242 is shown in FIG. 2). The inner wall of the through hole 242 is perpendicular to the front surface 240 and the rear surface 241. However, the disclosure should not be limited thereto, the inner wall of the through hole 242 may be formed with an angle that is greater or smaller than 90 degrees relative to the front surface 240 or the rear surface 241. The two anchoring members 24 may be made of metal, resin, or another material.

Figure 3:
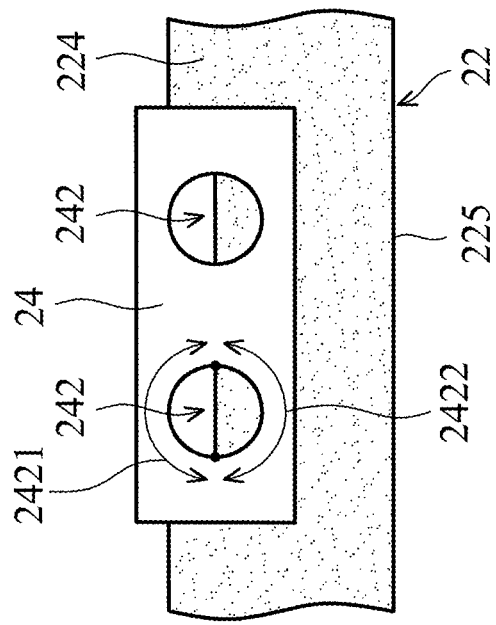
FIG. 3 shows a schematic view of an anchoring member connecting to a base, in accordance with some embodiments of the disclosure.

Referring to FIG. 3, in some embodiments, the two through holes 242 on each anchoring member 24 are spaced apart by a distance. In addition, the two through holes 242 are respectively arranged adjacent to the two opposite sides of each anchoring member 24. That is, the distance between the through hole 242 to the center of the anchoring member 24 is greater than the distance between the through hole 242 and the adjacent side of the anchoring member 24, thereby enhancing the structure's strength.

In some embodiments, as shown in FIG. 3, each of the through holes 242 is formed with a circular shape with a closed structure, but the disclosure should not be limited thereto. The through holes 242 may be formed in another shape, and/or the through holes 242 may be formed in an open structure. For example, as shown in FIG. 4, an anchoring member 24a is disposed on the base 22a, and two through holes 242a formed on the anchoring member 24a have an arc shape with an open structure.

Figure 4:
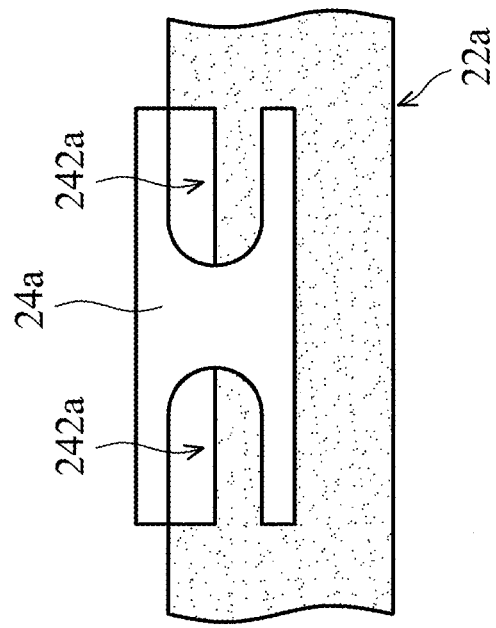
FIG. 4 shows a schematic view of an anchoring member connecting to a base, in accordance with some embodiments of the disclosure.

It should be noted that while in the embodiments shown in FIGS. 3 and 4, the two through holes that are formed on a single anchoring member have the same shape and size, the shape and the size of the two through holes may be different. In addition, the number of through holes may be one, two, or more.

Still referring to FIG. 3, in some embodiments, the anchoring member 24 is formed on the extension portion 224 of the base 22 by an insert molding technique. A portion of the anchoring member 24 is inserted in the extension portion 224 of the base 22, and the other portion of anchoring member 24 is exposed by the extension portion 224 of the base 22. Specifically, as shown in FIG. 3, the inner wall of the through hole 242 includes a first segment 2421 and a second segment 2422. The second segment 2422 of the through hole 242 is covered by the base 22, and the first segment 2421 of the through hole 242 is exposed by the base 22.

Moreover, as shown in FIG. 2, the front surface 240 of the anchoring member 24 is flush with the lateral surface 220 of the base 22 which is adjacent to the lateral housing member 102. The front surface 240 is not covered by the anchoring member 24 and is exposed to the outside of the base 22. The advantage of this feature will be described later.

It should be noted that while the extension portion 224 is disposed on the anchoring member 24, the disclosure should not be limited thereto. In some other non-illustrated embodiments, the extension portion is eliminated. The anchoring member 24 is directly disposed on the lateral surface of the main body 222. Additionally, there can be one or more than one anchoring members 24. Moreover, the position where the anchoring member 24 is disposed may be altered, and is not limited to the two opposite lateral surfaces of the base 22.

FIG. 5 shows a schematic view of a method of assembling partial elements of the lens driving module 1. In some embodiments, the magnetic element 16 and the base 22 are connected to the housing 10 according to stages described below. First, an intermediate material 50 is supplied on the magnetic element 16 and/or the inner surface 105 of the lateral housing member 102. Afterwards, the magnetic element 16 is positioned on the inner surface 105 of the lateral housing member 102. While at the same time, the lower edge (the edge close to the position where the base 22 is connected) of the magnetic element 16 is connected to the intermediate material 50. In some embodiments, the operation to connect the magnetic element 16 to the housing 10 is omitted. The intermediate material 50 is directly supplied on the inner surface of the lateral housing member 102.

Afterwards, the base 22 which has an anchoring member 24 disposed thereon is inserted into the bottom of the housing 10 in a direction indicated by the arrow 6 shown in FIG. 5. While at the same time, as shown in FIG. 5, there is a gap G between the inner surface 105 and lateral surface 220 and between the inner surface 105 and front surface 240. They are not connected to the other in a tight manner. Therefore, while the base 22 is being inserted into the housing 10, the intermediate material 50 flows into the gap G based on a capillary phenomenon. The intermediate material 50 is in contact with the lateral surface 220, the front surface 240, and the inner surface 105. The width of the gap G may be in a range from about 0.1 mm to about 0.2 mm.

When the base 22 is positioned in the housing 10, as shown in FIG. 2, a portion of the intermediate material 50 flows into the through hole 242 and covers the first segment 2421 of the inner wall of the through hole 242. The intermediate material 50 connects the inner wall of the through hole 242 to the front surface 240 of the anchoring member 24. Moreover, a portion of the intermediate material 50 covers the rear surface 241 of the anchoring member 24. The intermediate material 50 connects the inner wall of through hole 242 to the rear surface 241 of the anchoring member 24.

Afterwards, the intermediate material 50 is cured. In some embodiments, the intermediate material 50 is a thermoset adhesive, such as Epoxy. The intermediate material 50 is cured at a high temperature. In some other embodiments, the intermediate material 50 includes acrylic glue and is cured by projecting light or supplying moist air.

As shown in FIG. 2, after the curing of the intermediate material 50, the lateral surface 220 of the base 22 and the front surface 240 of the anchoring member 24 are stably connected to the inner surface of the lateral housing member 102 via the intermediate material 50. In some embodiments, the bonding force between the intermediate material 50 and the metallic anchoring member 24 is greater than that between intermediate material 50 and the plastic base 22. As a result, the base 22 can still be firmly connected to the housing 10 even if the thickness of the base 22 is decreased, i.e., the contact area of the base 22 to the intermediate material 50 is decreased.

Moreover, as shown in FIG. 2, after the intermediate material 50 is cured, the portion of the intermediate material 50 that passes through the through hole 242 serves as a hook to increase the bonding strength between the base 22 and the housing 10. Therefore, as an impact to the lens driving module 1 occurs, the base 22 is prevented from being separated from or being offset with the housing 10.

In some embodiments, the connection relationship of the intermediate material 50 and the anchoring member 24 is varied in relation to the amount of the intermediate material 50 supplied, the viscosity of the intermediate material 50, or the width of the gap G. Therefore, the connection relationship of the intermediate material 50 and the anchoring member 24 should not be limited to the above-mentioned embodiments.

Figure 6:
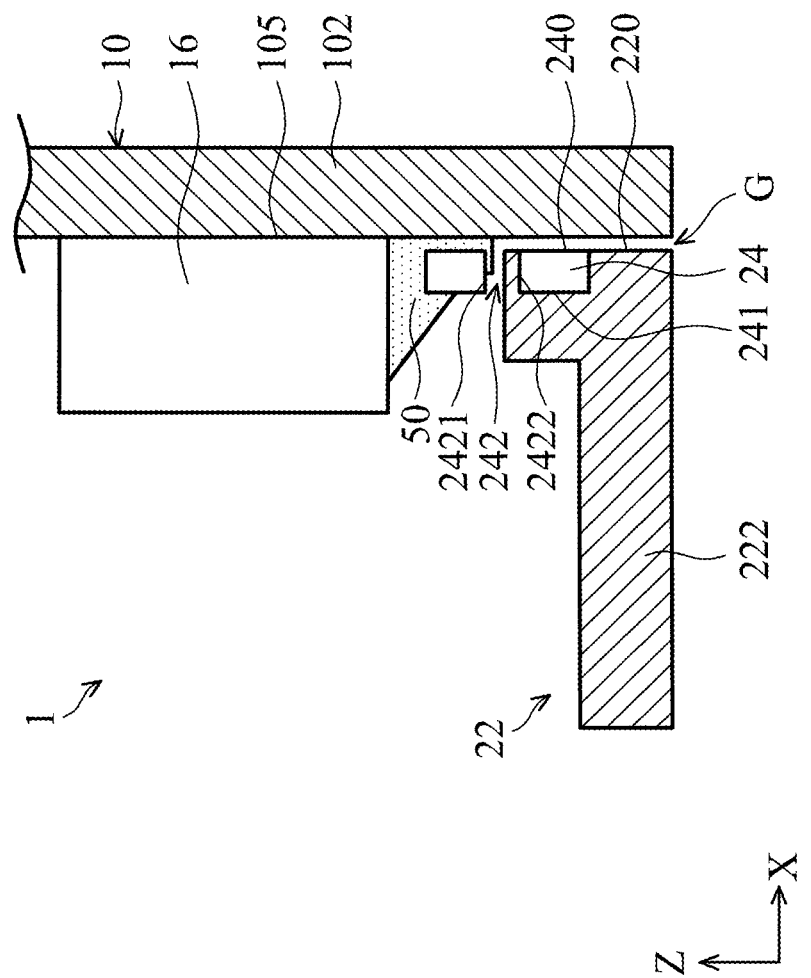
FIG. 6 shows a schematic view of a lens driving module, in accordance with some embodiments of the disclosure.

For example, as shown in FIG. 6, the through hole 242 of the anchoring member 24 is not completely filled by the through hole 242, and a region on the first segment 2421 of the inner wall that is adjacent to the rear surface 241 is not covered by the intermediate material 50. A clamping surface of the anchoring member 24 is defined at the first segment 2421 of the inner wall that is covered by the intermediate material 50. The intermediate material 50 connects the clamping surface of the anchoring member 24 to the front surface 240 of the anchoring member 24. The base 22 is connected to the housing 10 via the intermediate material 50 between the anchoring member 24 and the lateral housing member 102 and via the intermediate material 50 filled in the through hole 242.

In some embodiments, the segment of the inner wall that is covered by intermediate material 50 is referred to as the first segment 2421, and the segment of the inner wall that is covered by intermediate material 50 is referred to as the second segment 2422. The first segment 2421 may be directly connected to the second segment 2422. Alternatively, the first segment 2421 may be separated from the second segment 2422. For example, in the embodiments shown in FIG. 3, the first segment 2421 is directly connected to the second segment 2422. Two ends of the first segment 2421 are respectively overlapped with two ends of the second segment 2422. In the embodiments shown in FIG. 6, the first segment 2421 is separated from the second segment 2422. Two ends of the first segment 2421 do not overlap with two ends of the second segment 2422.

Figure 7:
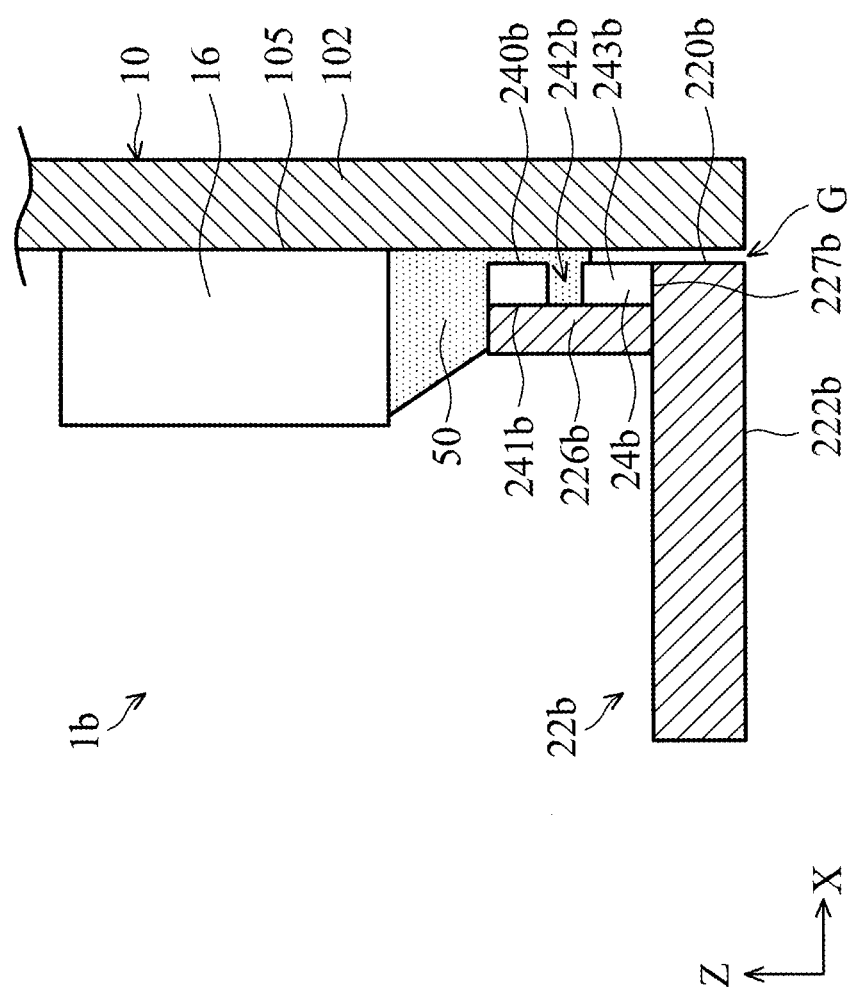
FIG. 7 shows a schematic view of a lens driving module, in accordance with some embodiments of the disclosure.

FIG. 7 shows a schematic view of partial elements of a lens driving module 1b in accordance with another embodiment. In the embodiments shown in FIG. 7, elements that are similar to that shown in FIG. 2 are provided with the same reference numbers, and the features thereof are not reiterated in the interests of brevity. Differences between the lens driving module 1b and the lens driving module 1 include the base 22 being replaced by the base 22b, and the anchoring member 24 being replaced by the anchoring member 24b.

In some embodiments, the base 22b includes a main body 222b and a block plate 226b. The block plate 226b extends upward from the main body 222b and is spaced from the lateral surface 220b of the base 22b by a distance. The lateral surface 220b is arranged adjacent to the lateral housing member 102. A mounting surface 227b connects the block plate 226b to the lateral surface 220b, and the anchoring member 24b is positioned on the mounting surface 227b. In some embodiments, the width of the mounting surface 227b is equal to the thickness of the anchoring member 24b. The rear surface 241b of the anchoring member 24b faces the block plate 226b, the front surface 240b of the anchoring member 24b is flush with the lateral surface 220b.

Figure 8:
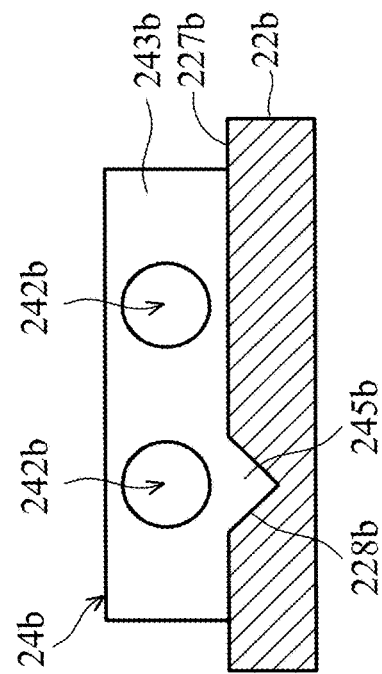
FIG. 8 shows a schematic view of an anchoring member connecting to a base, in accordance with some embodiments of the disclosure.

Referring to FIG. 8, in some embodiments, the anchoring member 24b includes an engaging portion 243b and a coupling portion 245b connecting to the engaging portion 243b. The front surface and the rear surface of the anchoring member 24b are penetrated by the two through holes 242b.

In some embodiments, the two through holes 242b of the anchoring member 24b are spaced apart from each other. Each of the through holes 242b is formed with a circular shape with a closed structure, but the disclosure should not be limited thereto. The through holes 242b may be formed in another shape, and/or the through holes 242b may be formed in an open structure. For example, the through holes 242b may have an arc shape with an open structure similar to the through hole 242 shown in FIG. 4.

The coupling portion 245b is connected to the engaging portion 243b and is configured to be engaged with the base 222b. In some embodiments, the coupling portion 245b has a triangular cross section, and the base 222b includes an insertion hole 228b formed corresponding to the coupling portion 245b. When the anchoring member 24b is connected to the base 22b, the coupling portion 245b forms a tight fit with the insertion hole 228b. As the anchoring member 24b is connected to the base 22b, the engaging portion 243b is located above the mounting surface 227b, and the coupling portion 245b is located beneath the mounting surface 227b. The engaging portion 243b is not covered by the base 222b, and the inner wall of the through hole 242b is not covered by the base 22b.

While the base 22 is being inserted into the housing 10, as shown in FIG. 7, a portion of the intermediate material 50 flows into the gap G between the anchoring member 24b and the lateral housing member 102 based on the capillary phenomenon. The intermediate material 50 is in contact with the lateral surface 240b and the inner surface 105. In addition, the other portion of the intermediate material 50 flows into the through hole 242b via the gap G and covers the inner wall of the through hole 242b. The intermediate material 50 connects the inner wall of the through hole 242b to the front surface 240b of the anchoring member 24b. With the anchoring member 24b and the intermediate material 50, the base 22b and the housing 10 are firmly connected to each other. As a result, the problem of the base 22b becoming separated from the housing 10 as impact occurs can be avoided.

Figure 9:
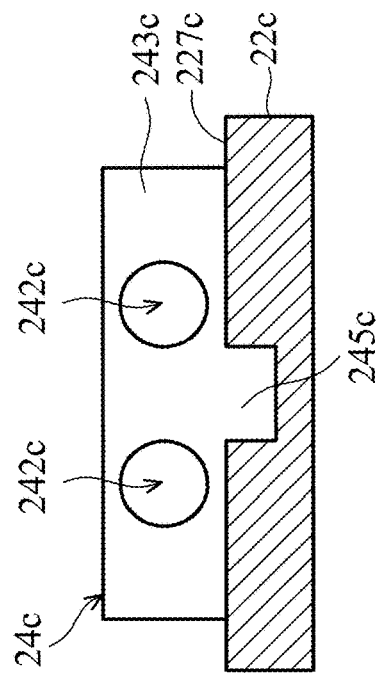
FIG. 9 shows a schematic view of an anchoring member connecting to a base, in accordance with some embodiments of the disclosure.

FIG. 9 shows a schematic view of the anchoring member 24c connecting to the base 22c in accordance with another embodiment. In the embodiments shown in FIG. 9, elements similar to those shown in FIG. 8 are provided with the same reference numbers, and the features thereof are not reiterated in the interests of brevity.

In some embodiments, the anchoring member 24c includes an engaging portion 243c and a coupling portion 245c connecting to the engaging portion 243c. The front surface and the rear surface of the anchoring member 24c are penetrated by the two through holes 242c, and the inner wall of each through hole 242c is perpendicular to the front surface and the rear surface of the anchoring member 24c. The two through holes 242c of the anchoring member 24c are spaced apart from each other. Each of the through holes 242c is formed with a circular shape with a closed structure, but the disclosure should not be limited thereto. The through holes 242c may be formed in other shapes, and/or the through holes 242c may be formed in an open structure. For example, the through holes 242c may have an arc shape with an open structure similar to the through hole 242 shown in FIG. 4.

The coupling portion 245c is connected to the engaging portion 243c and is configured to be engaged with the base 22c. In some embodiments, the coupling portion 245c has a rectangular cross section. To connect the anchoring member 24c to the base 22c, the coupling portion 245c is inserted into the base 22c by an insert molding technique. As the anchoring member 24c is connected to the base 22c, the engaging portion 243c is located above the mounting surface 227c, and the coupling portion 245c is located beneath the mounting surface 227c. The engaging portion 243c is not covered by the base 22c, and the inner wall of the through hole 242c is not covered by the base 22c.

FIG. 10 shows a schematic view of the anchoring member 24d connecting to the base 22d in accordance with another embodiment. In the embodiments shown in FIG. 10, elements similar to those shown in FIG. 8 are provided with the same reference numbers, and the features thereof are not reiterated in the interests of brevity.

In some embodiments, the anchoring member 24d includes an engaging portion 243d and a coupling portion 245d connecting to the engaging portion 243d. The front surface and the rear surface of the anchoring member 24d are penetrated by the two through holes 242d, and the inner wall of each through hole 242d is perpendicular to the front surface and the rear surface of the anchoring member 24d. In some embodiments, the two through holes 242d of the anchoring member 24d are spaced apart from each other. Each of the through holes 242d is formed with a circular shape with a closed structure, but the disclosure should not be limited thereto. The through holes 242d may be formed in other shapes, and/or the through holes 242d may be formed in an open structure. For example, the through holes 242d may have an arc shape with an open structure similar to the through hole 242 shown in FIG. 4.

The coupling portion 245d is connected to the engaging portion 243d and is configured to be engaged with the base 22d. In some embodiments, the width of the coupling portion 245d is greater than the width of the engaging portion 243d. The base 22 includes a recess 229d formed on the bottom surface and a through hole 230d formed on the mounting surface 227d. The through hole 230d communicates with the recess 229d. To connect the anchoring member 24d to the base 22d, as shown in FIG. 10, the anchoring member 24d is moved along a direction indicated by the arrow 7. The movement is stopped as the engaging portion 243d is inserted into the through hole 230d and the coupling portion 245d is inserted into the recess 229d, as shown in FIG. 11. As the anchoring member 24d is connected to the base 22d, the two through holes 242d are located above the mounting surface 227d, and the inner walls of the two through holes 242d are not covered by the base 22d.

FIG. 12 shows a schematic view of partial elements of the lens driving module 1e in accordance with another embodiment. In the embodiments shown in FIG. 12, elements similar to those shown in FIG. 7 are provided with the same reference numbers, and the features thereof are not reiterated in the interests of brevity.

Differences between the lens driving module 1e and the lens driving module 1b include the lateral housing member 102 being replaced by the lateral housing member 102e.

In some embodiments, a mounting hole 104e is formed on the lateral housing member 102e of the housing 10e. In some embodiments, the base 22b is connected to the housing 10e by the following method. First, the base 22b which has an anchoring member 24b disposed thereon is inserted into the bottom of the housing 10e to make the through hole 242b of the anchoring member 24b align with the mounting hole 104e of the housing 10e. Afterwards, the intermediate material 50 is supplied into the mounting hole 104e via the through hole 242b. At the same time, the intermediate material 50 flows into the gap G formed between the lateral housing member 102e and the anchoring member 24b based on the capillary phenomenon. The intermediate material 50 is in contact with the front surface 240b and the inner surface 105e.

Afterwards, the intermediate material 50 is cured. After the intermediate material 50 is cured, the front surface 240b of the anchoring member 24b is stably connected to the inner surface 105e of the lateral housing member 102b via the intermediate material 50. In addition, the portion of the intermediate material 50 that passes through the through hole 242b serves as a hook to increase the bonding strength between the base 22b and the housing 10e. Therefore, as impact occurs on the lens driving module 1, the base 22b is prevented from being separated from or being offset with the housing 10e.

Figure 13:
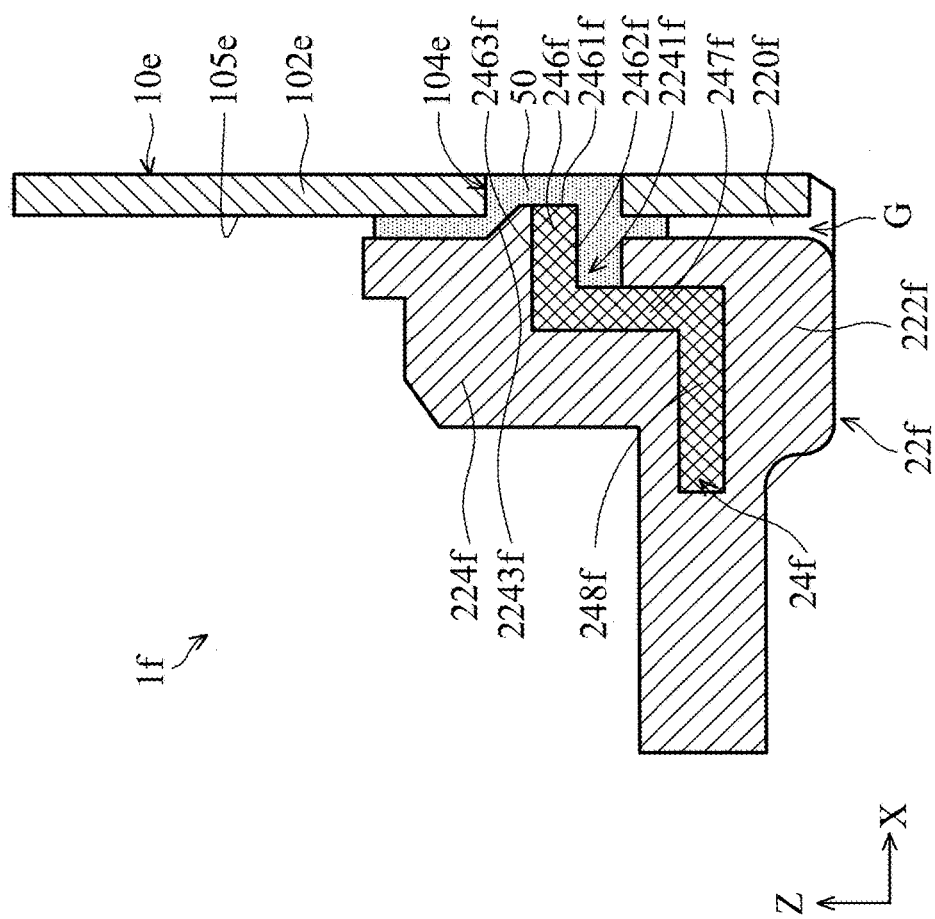
FIG. 13 shows a schematic view of an anchoring member connecting to a base, in accordance with some embodiments of the disclosure.

FIG. 13 shows a schematic view of partial elements of the lens driving module 1f in accordance with another embodiment. In the embodiments shown in FIG. 13, elements similar to those shown in FIG. 12 are provided with the same reference numbers, and the features thereof are not reiterated in the interests of brevity.

The base 22f includes a main body 222f and an extension portion 224f. The extension portion 224f is arranged adjacent to the lateral surface 220f and upwardly protrudes from the main body 222f. A groove 2241f is formed on the lateral surface 220f relative to the extension portion 224f, and a protrusion 2243f is formed on the lateral surface 220f and arranged immediately adjacent to the upper side wall of the groove 2241f.

In some embodiments, the anchoring member 24f is a metal plate and is bent to a number of segments, such as a first segment 246f, a second segment 247f, and a third segment 248f. The third segment 248f is buried in the main body 222f and extends in a horizontal direction. The second segment 247f connects to the third segment 248f and extends in a vertical direction. The first segment 246f connects to the second segment 247f and extends from the groove 2241f to the outside of the groove 2241f in a horizontal direction. In some embodiments, the length of the first segment 246f is greater than the depth of the groove 2241f. As a result, the end surface of the first segment 246f is located outside of the groove 2241f and is flush with the protrusion 2243f. In some embodiments, the upper surface 2463f of the first segment 246f is abutted by the upper side wall of the groove 2241f and abutted by the protrusion 2243f. In addition, the thickness of the first segment 246f is less than the width of the groove 2241f. Therefore, the groove 2241f is not completely occupied by the first segment 246f.

It should be noted that while the three segments of the anchoring member 24f in shown in FIG. 13 are perpendicular to one another, the disclosure should not be limited thereto. The segments of the anchoring member may be formed at any angle that is greater than 0 degrees relative to the neighboring segment, and the number of segments of the anchoring member may be increased or reduced.

In some embodiments, the base 22f is connected to the housing 10e by the following method. First, the base 22f which has an anchoring member 24f disposed thereon is inserted into the bottom of the housing 10e. The movement is stopped as the protrusion 2243f engages with the mounting hole 104e of the housing 10e. While at the same time, the groove 2241f faces the mounting hole 104e. Afterwards, the intermediate material 50 is supplied into the groove 2241f via the mounting hole 104e. At the same time, the intermediate material 50 flows into the gap G formed between the lateral housing member 102e and the base 22f based on the capillary phenomenon. Therefore, the end surface 2461f and the bottom surface 2462f of the anchoring member 24f are covered by the intermediate material 50. In the embodiments, the end surface 2461f is referred to as the front surface of the anchoring member 24f, and the surface 2462f is referred to as the clamping surface of the anchoring member 24f.

Afterwards, the intermediate material 50 is cured. After the curing of the intermediate material 50, the base 22f is stably connected to the inner surface 105e of the lateral housing member 102b via the intermediate material 50. Moreover, the portion of the intermediate material 50 that covers the bottom surface 2462f of the anchoring member 24f serves as a hook to increase the bonding strength between the base 22f and the housing 10e. Therefore, as an impact occurs on the lens driving module 1f, the base 22f is prevented from being separated from or being offset with the housing 10e.

In accordance with some embodiments, the shape of the mounting hole of the housing is described below.

Figure 14:
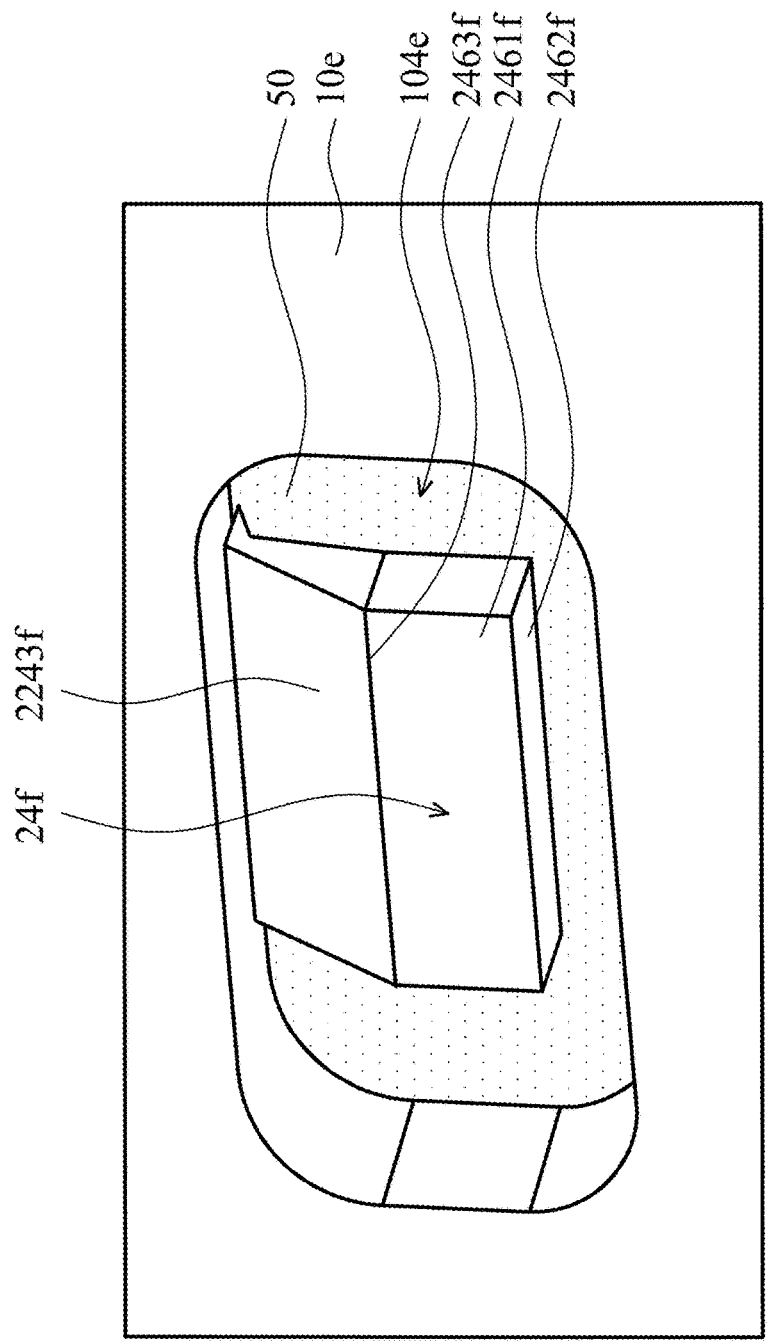
FIG. 14 shows a schematic view of an anchoring member connecting to a base, in accordance with some embodiments of the disclosure.

In some embodiments, as shown in FIG. 14, the mounting hole 104e of the housing 10e is formed with a rectangular shape with a closed structure and includes four round corners. The width of the mounting hole 104e in the horizontal direction is greater than the width of the anchoring member 24f in the horizontal direction.

Figure 15:
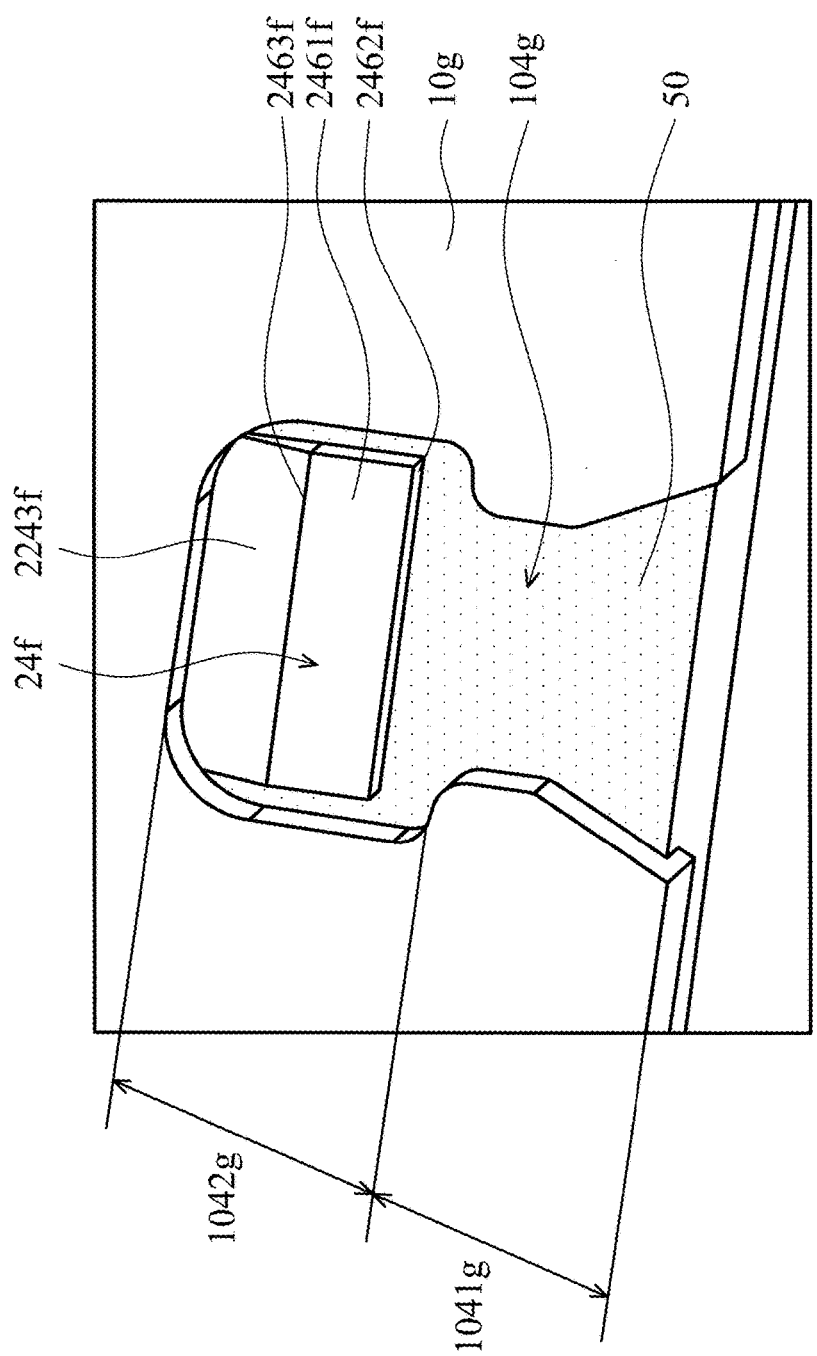
FIG. 15 shows a schematic view of an anchoring member connecting to a base, in accordance with some embodiments of the disclosure.

Alternatively, as shown in FIG. 15, the mounting hole 104g of the housing 10g is a through hole with an open structure. The mounting hole 104g includes a first region 1041g and a second region 1042g. The first region 1041g connects to the bottom edge of the housing 10g, and the second region 1042g connects to the first region 1041g. The width of the first region 1041g in the horizontal direction gradually decreases along a direction away from the bottom edge of the housing 10g. The width of the second region 1042g in the horizontal direction is greater than the width of the anchoring member 24f in the horizontal direction for facilitating the assembly of the base 22 and the housing 10e.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens driving module, comprising:
a lens assembly having an optical axis;
a base having an anchoring member protruding from the base, the anchoring member having a first surface a second surface and a third surface, wherein the lens assembly is moveably connected to the base, the first surface and the second surface are parallel to the optical axis but not positioned on a same plane, and the third surface connects the first surface and the second surface;
a lens driving assembly, configured to drive the movement of the lens assembly relative to the base; a housing surrounding the lens driving assembly and having a top surface and a sidewall, wherein the sidewall extends along the optical axis of the lens assembly from an edge of the top surface to the base, and the sidewall comprising:
an inner surface parallel to the optical axis and facing the base;
a first horizontal sidewall surface perpendicular to the optical axis and adjacent to the inner surface; and;
a binding adhesive, configured to connect the base to the housing, wherein the first surface faces the inner surface, and the binding adhesive binds the first surface, the second surface, the third surface, the inner surface and the first horizontal sidewall surface.

2. The lens driving module as claimed in claim 1, wherein the base further comprises a fourth surface, the fourth surface is adjacent to and not parallel to the first surface, and the binding adhesive binds the fourth surface.

3. The lens driving module as claimed in claim 2, wherein the fourth surface faces a light exit end of the lens driving module.

4. The lens driving module as claimed in claim 1, wherein a portion of the anchoring member is embedded in the base.

* * * * *